Oct. 27, 1925.

E. THOMSON 1,559,203

PROCESS OF AND APPARATUS FOR PURIFYING FUSIONS

Filed June 1, 1925

Inventor,
Elihu Thomson,
by *Alexander S. Lantz*
Attorney.

Patented Oct. 27, 1925.

1,559,203

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

PROCESS OF AND APPARATUS FOR PURIFYING FUSIONS.

Application filed June 1, 1925. Serial No. 34,086.

*To all whom it may concern:*

Be it known that I, ELIHU THOMSON, a citizen of the United States, residing at Swampscott, in the county of Essex, State of Massachusetts, have invented certain new and useful Improvements in Processes of and Apparatus for Purifying Fusions, of which the following is a specification.

The present invention relates to the preparation of vitreous or fused quartz in a homogeneous clear condition and it comprises both a new process and an apparatus for removing gas or other suspended matter from viscous fusions, such as fused quartz.

Quartz, when fused under ordinary working conditions, is much more viscous than ordinary fused glass, and the fusion is charged with numerous air bubbles which, due to the nature of the material, cannot be readily removed. When the temperature of the quartz is raised much above the value at which the viscous mass is formed volatilization occurs, hence a thin liquid cannot be formed.

In accordance with my invention, gas bubbles and other impurities are segregated from fusions by centrifugal force in such a way that a major portion of the fusion is left in a clear, homogeneous condition. The homogeneous portion of the material then is separated from the portion containing gas bubbles, for example, the impure material is caused to collect at one end of an ingot and is removed after the ingot has cooled.

The accompanying drawing shows an apparatus suitable for carrying out my invention, this apparatus also embodying features of novelty and in particular including an induction heater.

Figure 1:
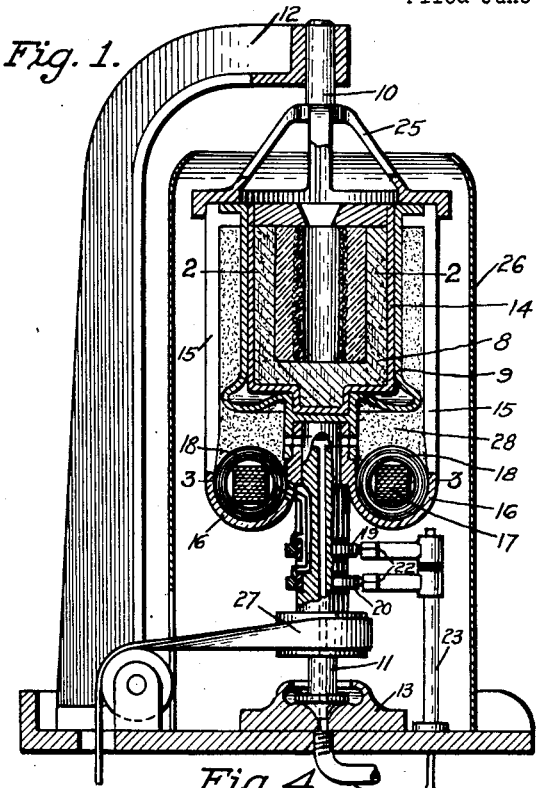
Figure 2:
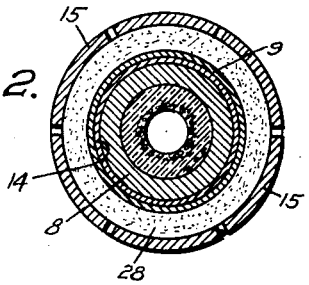
Figure 3:
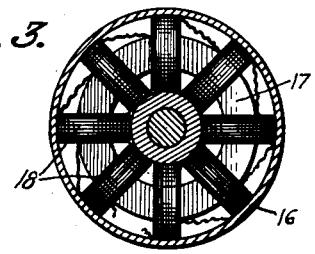
Figure 4:
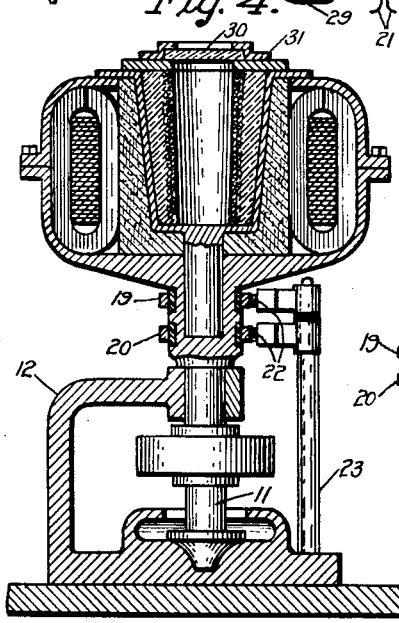
Figure 7:
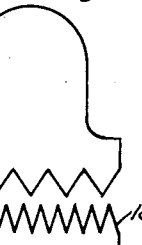
Figure 5:
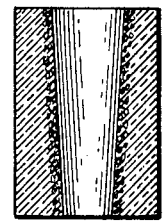
Figure 6:
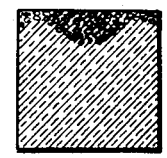

Fig. 1 is an elevation partly in section of my apparatus; Fig. 2 is a horizontal section of the crucible on the line 2—2 of Fig. 1; Fig. 3 is a section taken on line 3—3 of Fig. 1 showing the arrangement of the primary windings of the induction heater; Fig. 4 is a vertical section of a modification; Figs. 5 and 6 are vertical sections of a fused quartz ingot in different stages and Fig. 7 is an electrical diagram.

In the apparatus illustrated heat is supplied to the fusion which may be assumed to consist of quartz in a crucible which is rotated at high speed causing the fusion to assume the shape of a hollow cylinder and causing the lighter gas-containing material to accumulate upon the interior surface of the hollow cylinder. The crucible conveniently is heated by a resistor which constitutes the secondary of an induction furnace forming part of the rotating structure.

In the form of the apparatus shown in Fig. 1 the crucible 8 and the induction heater 9 are rotatively supported by the shafts 10, 11, the upper shaft 10 rotating within a bearing on a vertical arm 12 and the lower shaft 11 being supported on a thrust bearing which rests on a base plate 13. The revolving crucible, which may consist of graphite, is built within a resistor 14 which also supports the crucible.

The resistor 14 which may consist of tungsten or molybdenum forms part of the secondary circuit of a transformer, the circuit being completed by segments 15 forming the exterior casing of the crucible structure and by the conductors 16 which surround the iron core 17. The primary windings 18 consist of a set of coils of copper wire connected as usual in series or parallel and their terminals are connected to the slip rings 19, 20 which are mounted on the shaft 11. Current is conveyed from an external circuit 21 (Fig. 7) to these rings by the brushes 22 which are mounted on a standard 23. Suitable external regulating devices may be used as indicated at 24, Fig. 7. The upper part of the structure is secured to the shaft 10 by a yoke 25. The entire structure is surrounded by a shield 26 and is rotated by a belt and pulley 27 or other suitable means. Surrounding the resistor 14 is a suitable heat insulating material 28. Hydrogen or other suitable protective gas may be conducted through passages in the shaft 11 which communicate with a supply pipe 29 in order to avoid oxidation of the heater parts or of the fusion when it consists of oxidizable material.

In carrying out my improved fusion and purification process the raw material, which may consist of fragments of quartz rock crystal, is packed within crucible 8 and is brought to fusion by raising the temperature progressively to about 1650° to 1700° C. The apparatus is then set into rotation at a relatively high speed, say at the rate of 1500 revolutions or more per minute according to the scale of apparatus or desired speed of work, the effect of this rotation being to cause the fusion to assume a cylindrical shape as shown in Fig. 1 and to cause the gas bubbles and impurities to assume a position upon the interior of the cylinder as illustrated. If now the current is cut off and the apparatus allowed to cool while still rotating there will be left in the crucible a hollow cylinder with thick walls as shown in Fig. 5 and as here illustrated the impurities will be found segregated. However, I prefer to continue the heating after the rotation of the apparatus is stopped, thereby causing the cylinder to coalesce in the form of a solid ingot, the frothy part of the mass gradually moving to the top finally forming a distinct upper layer as shown in Fig. 6, the lower part being high grade vitreous quartz. The upper impure portion of the quartz which is opaque then is cut off in any suitable way, as for example, by a band of copper or other metal charged with an abrasive, leaving a clear homogeneous mass of quartz which may be cut into desired sections in the solid conditions or which may be reheated and molded while plastic to the desired form.

The rotating structure may be modified in various ways the essential feature being means for simultaneously heating the quartz and subjecting the fusion to centrifugal force. A modified structure is shown in Fig. 4 in which the primary elements of the transformer surround the crucible. This structure is somewhat more compact and as illustrated, the supporting arm 12 and the brushes supplying the current have a somewhat modified relation to the rest of the structure. It will be observed that in this modification the upper part of the crucible is unobstructed so that the interior may be observed. For this purpose the crucible is surmounted by a plate 30 consisting of clear quartz which is secured by a clamping plate 31 to the upper part of the crucible. This observation plate will remain unfused because it is out of immediate heating relation to the resistor surrounding the crucible and is cooled by convection currents in the atmosphere.

What I claim as new and desire to secure by Letters Patent of the United States, is:—

1. The process of removing suspended particles from materials forming viscous fusions which consists in fusing said materials, subjecting the fusion to centrifugal force sufficiently great to segregate said particles in one portion of the fusion, allowing the fusion to solidify and mechanically separate the part of the mass containing the impurities from the purified remainder.

2. The process of making vitreous silica in a homogeneous, clear condition which consists in fusing silica, subjecting the fusion to centrifugal force sufficiently great to segregate trapped gases in one portion of said fusion, allowing the fusion to solidify and removing the portion of said fusion containing trapped gas.

3. An apparatus for treating refractory materials comprising a crucible, means for rotating the same at sufficiently high speed to segregate materials therein by centrifugal force, and means for heating said crucible during rotation.

4. An apparatus for subjecting fusions of refractory materials to centrifugal force which comprises a refractory crucible, a looped resistor surrounding the same, means for heating said resistor by induction, means for surrounding said structure with a protective gas.

5. An apparatus for producing clear, vitreous quartz comprising a crucible of refractory metal, an induction heater therefor, means for rotating said crucible at high speed and means for surrounding said crucible and heater with a protective gas.

In witness whereof, I have hereunto set my hand this 28th day of May, 1925.

ELIHU THOMSON.